United States Patent
Ditty

(10) Patent No.: US 9,776,846 B2
(45) Date of Patent: Oct. 3, 2017

(54) SYSTEMS AND METHODS FOR DYNAMIC MACHINE STABILITY

(71) Applicant: Oshkosh Corporation, Oshkosh, WI (US)

(72) Inventor: McKenzie M. Ditty, Hagerstown, MD (US)

(73) Assignee: Oshkosh Corporation, Oshkosh, WI (US)

(*) Notice: Subject to any disclaimer, the term of this patent is extended or adjusted under 35 U.S.C. 154(b) by 106 days.

(21) Appl. No.: 14/209,483

(22) Filed: Mar. 13, 2014

(65) Prior Publication Data
US 2015/0259185 A1    Sep. 17, 2015

(51) Int. Cl.
*B66F 11/00* (2006.01)
*B66F 17/00* (2006.01)
*B66F 11/04* (2006.01)
*B66F 9/075* (2006.01)

(52) U.S. Cl.
CPC ........ *B66F 17/006* (2013.01); *B66F 9/07559* (2013.01); *B66F 11/046* (2013.01)

(58) Field of Classification Search
CPC ........................... B66F 11/046; B66F 9/07559
See application file for complete search history.

(56) References Cited

U.S. PATENT DOCUMENTS

| | | | |
|---|---|---|---|
| 3,899,037 A | 8/1975 | Yuker | |
| 6,443,687 B1 | 9/2002 | Kaiser | |
| 6,477,455 B2 | 11/2002 | Panizzolo | |
| 6,991,119 B2 | 1/2006 | Puszkiewicz et al. | |
| 7,198,278 B2* | 4/2007 | Donaldson | B62D 49/08 180/209 |
| 7,425,004 B2 | 9/2008 | Donaldson | |
| 7,832,741 B2 | 11/2010 | Donaldson | |
| 7,866,671 B2 | 1/2011 | Madler | |
| 7,871,083 B2 | 1/2011 | Urababa et al. | |
| 8,888,122 B2* | 11/2014 | Berry | B66C 23/62 180/212 |
| 2005/0189179 A1* | 9/2005 | Bean | B66F 17/006 187/277 |
| 2008/0277890 A1* | 11/2008 | Boster, II | B62D 7/06 280/62 |

(Continued)

FOREIGN PATENT DOCUMENTS

| | | |
|---|---|---|
| BE | 1009973 | 11/1997 |
| EP | 1 167 639 | 1/2002 |

(Continued)

OTHER PUBLICATIONS

International Search Report and Written Opinion for PCT/US2015/020135, mail date Dec. 16, 2015, 13 pages.

*Primary Examiner* — Alvin Chin-Shue
(74) *Attorney, Agent, or Firm* — Foley & Lardner LLP

(57) ABSTRACT

A lift device includes a chassis, a lift boom, a sensor, and a controller. The chassis includes a frame, an axle pivotally coupled to the frame, and an actuator positioned to move the axle. The lift boom is rotatably coupled to the chassis and operable within a work envelope, and the sensor is positioned to monitor an orientation of the lift boom. The controller is configured to engage the actuator based on the orientation of the lift boom. Engagement of the actuator moves the axle to adjust the work envelope of the lift boom.

6 Claims, 13 Drawing Sheets

(56) References Cited

U.S. PATENT DOCUMENTS

| | | | | |
|---|---|---|---|---|
| 2009/0118913 A1* | 5/2009 | O'Halloran | ........ | B60G 17/0165 |
| | | | | 701/50 |
| 2011/0042164 A1* | 2/2011 | Clark | .................... | B66F 17/006 |
| | | | | 182/2.2 |
| 2013/0020775 A1* | 1/2013 | Beji | ........................ | B60B 35/10 |
| | | | | 280/43 |

FOREIGN PATENT DOCUMENTS

| | | |
|---|---|---|
| EP | 1 346 943 | 9/2003 |
| EP | 1 698 497 | 9/2006 |
| EP | 2 555 067 | 2/2013 |
| EP | 2 641 860 | 9/2013 |
| WO | WO-2012/065157 | 5/2012 |
| WO | WO-2012/135882 | 10/2012 |

* cited by examiner

SYSTEMS AND METHODS FOR DYNAMIC MACHINE STABILITY

BACKGROUND

Traditional lift devices include a lift boom that is movable relative to a chassis. The lift boom may support an operator (e.g., on an aerial work platform) or another load (e.g., using lift forks) in an elevated position relative to a ground surface. The lift boom may be extensible and is rotatable into several positions relative to the chassis. The weight of the operator or other load, along with characteristics of the lift device (e.g., track width, wheelbase, etc.), are used to determine a region within which the lift boom is operable. Traditionally, lift devices have axles that are fixed to the chassis. The lift devices also have narrower track widths than wheel bases such that the lift boom is operable within a region that is larger in the forward and rearward directions and smaller in the sideward directions. Because traditional lift devices have fixed axles, the track width, the wheel base, and the area within which the lift boom is operable remains constant during operation of the lift device.

SUMMARY

One embodiment relates to a lift device that includes a chassis, a lift boom, a sensor, and a controller. The chassis includes a frame, an axle pivotally coupled to the frame, and an actuator positioned to move the axle. The lift boom is rotatably coupled to the chassis and operable within a work envelope, and the sensor is positioned to monitor an orientation of the lift boom. The controller is configured to engage the actuator based on the orientation of the lift boom. Engagement of the actuator moves the axle to adjust the work envelope of the lift boom.

Another embodiment relates to a lift device that includes a frame, a lift boom, a plurality of axles, a plurality of actuators, and a controller. The lift boom is rotatably coupled to the frame, movable between a first angular position and a second angular position, and operable within a work envelope. The plurality of axles each have a frame end pivotally coupled to the frame and a wheel end opposite the frame end. The plurality of axles comprise a first set of axles and a second set of axles. The plurality of actuators are coupled to the plurality of axles. The controller is configured to engage the plurality of actuators to rotate the first set of axles toward the lift boom when the lift boom is in the first angular position and rotate the second set of axles toward the lift boom when the lift boom is in the second angular position thereby adjusting the work envelope based on the position of the lift boom.

Yet another embodiment relates to a control system for a lift device having a lift boom that is operable within a work envelope. The control system includes an actuator configured to be coupled to an axle, a sensor positioned to monitor a condition of the lift boom and provide a sensing signal, and a controller. Engagement of the actuator varies a footprint of the lift device. The controller is configured to evaluate an orientation of the lift boom based on the sensing signal, determine a stability condition of the lift device based on the orientation of the lift boom, and generate a command signal based on the stability condition. The command signal engages the actuator to adjust the work envelope by varying the footprint of the lift device.

The invention is capable of other embodiments and of being carried out in various ways. Alternative exemplary embodiments relate to other features and combinations of features as may be generally recited in the claims.

BRIEF DESCRIPTION OF THE DRAWINGS

The invention will become more fully understood from the following detailed description taken in conjunction with the accompanying drawings wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Traditionally, a lift device has axles that are fixed in position, and the work envelope (e.g., the region within which a lift boom may be operated) remains fixed during operation. According to an exemplary embodiment, a lift device includes axles that are movably coupled to a frame. The axles are reconfigured to adjust the work envelope for the lift device. In one embodiment, a controller is configured to engage actuators to pivot the axles based on an orientation of the lift boom. By way of example, the controller may engage actuators to pivot the axles based on the rotational position of the lift boom. Movement of the axles adjusts the work envelope of the lift boom, thereby allowing a user to operate the lift boom within a larger area for the same platform load relative to traditional lift devices. By way of example, a user may extend the lift boom further outward without reaching the tipping point of the lift device. By way of another example, a user may elevate the lift boom further upward without reaching the tipping point of the lift device. Movement of the axles may allow the boom to carry more weight within the original operational area, and/or movement of the axles may reduce the overall weight of a lift device for the same operational area and load (e.g., by reducing the counterweight).

According to an exemplary embodiment, the work envelope for the lift device is related to the characteristics of the lift device (e.g., the center of gravity of the frame) and defines a region within which the lift boom may be operated. A stability condition may be determined based on the orientation of the lift boom (e.g., the rotational position of the lift boom, the extension length of the lift boom, the elevation of the lift boom, etc.). Evaluating stability conditions of lift devices is discussed in U.S. Pat. No. 6,991,119, issued Jan. 31, 2006 and titled "Measurement System and Method for Assessing Lift Vehicle Stability," which is incorporated herein by reference in its entirety. By way of example, the stability condition may include at least one of a distance from the center of gravity of the lift device to a tip line, a rate at which the center of gravity of the lift device is moving, and a position of the lift boom within the work envelope. According to an exemplary embodiment, a controller engages actuators to move axles of the lift boom thereby adjusting the work envelope of the lift boom. Adjusting the work envelope allows an operator to move the lift boom into previously-restricted areas.

Figure 1:
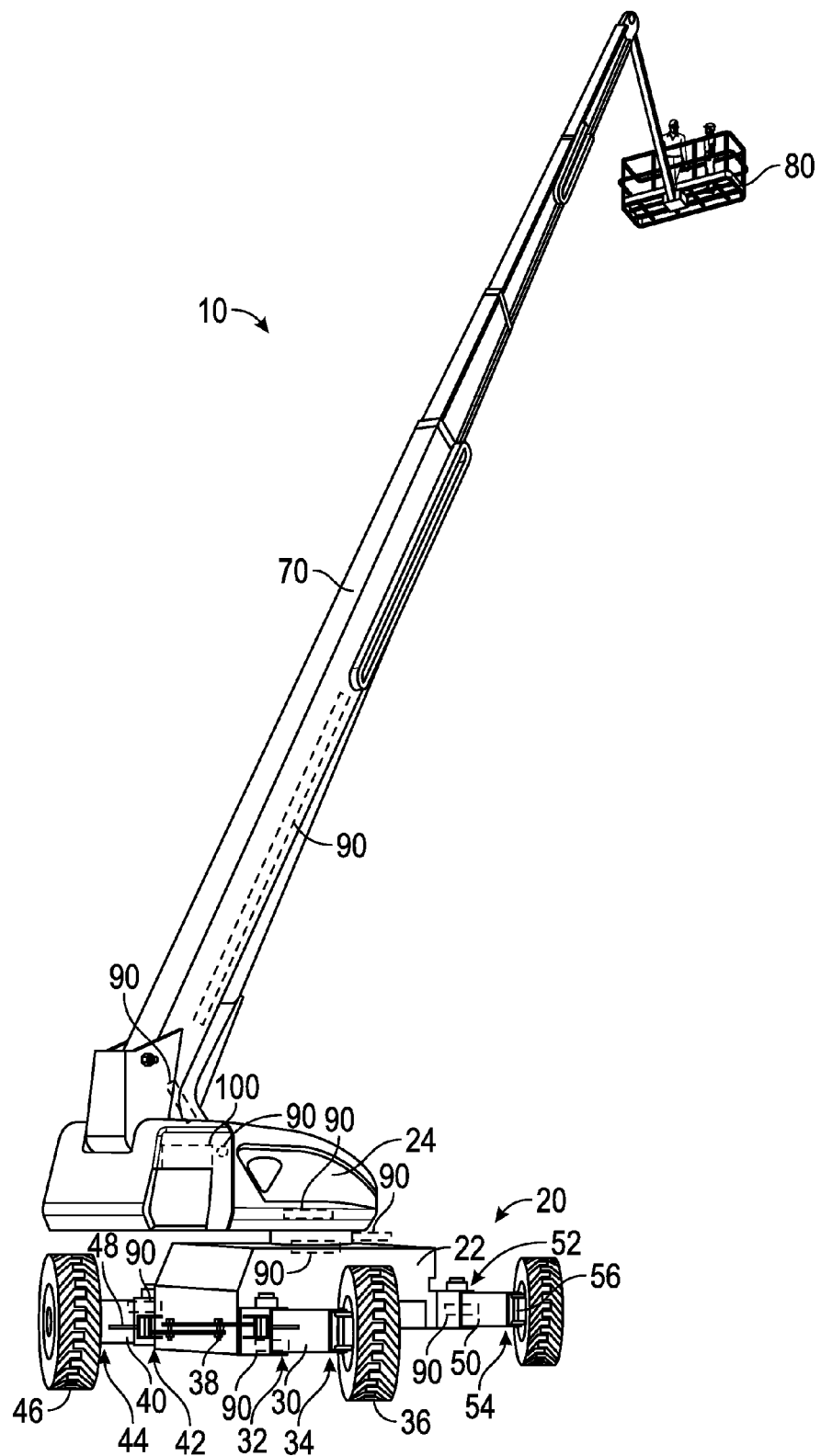
FIG. 1 is a perspective view of a lift device, according to an exemplary embodiment.
Figure 2:
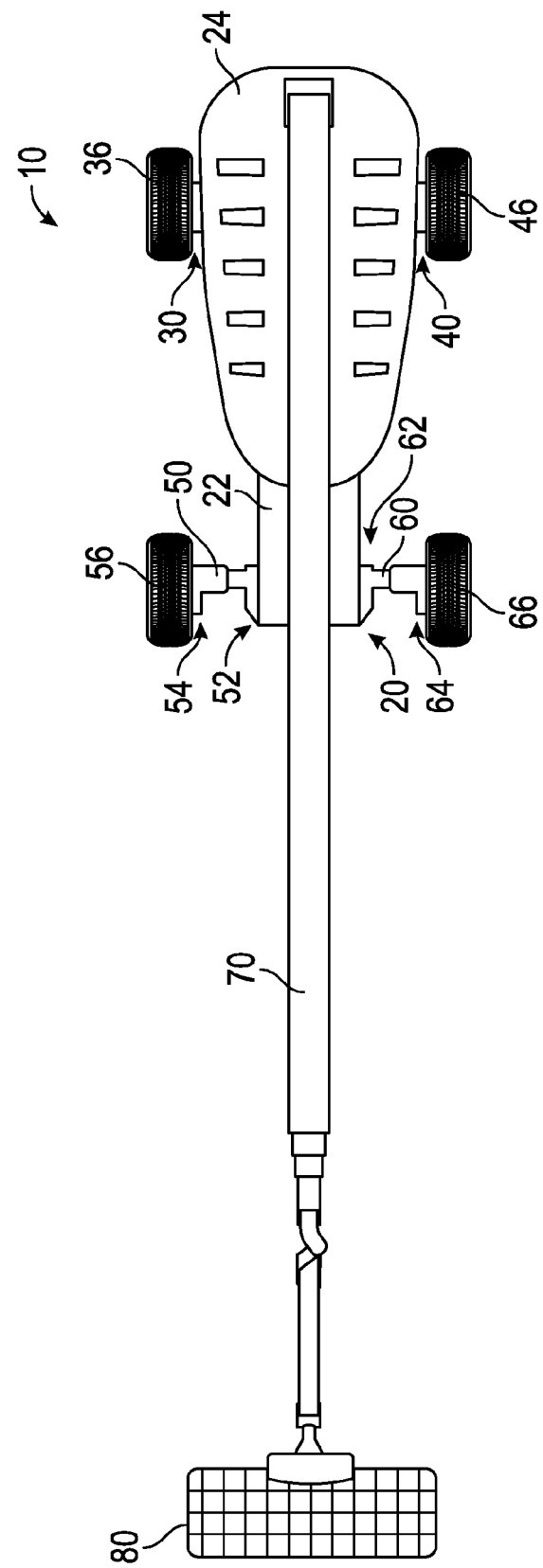
FIG. 2 is a top plan view of a lift device, according to an exemplary embodiment.
Figure 3:
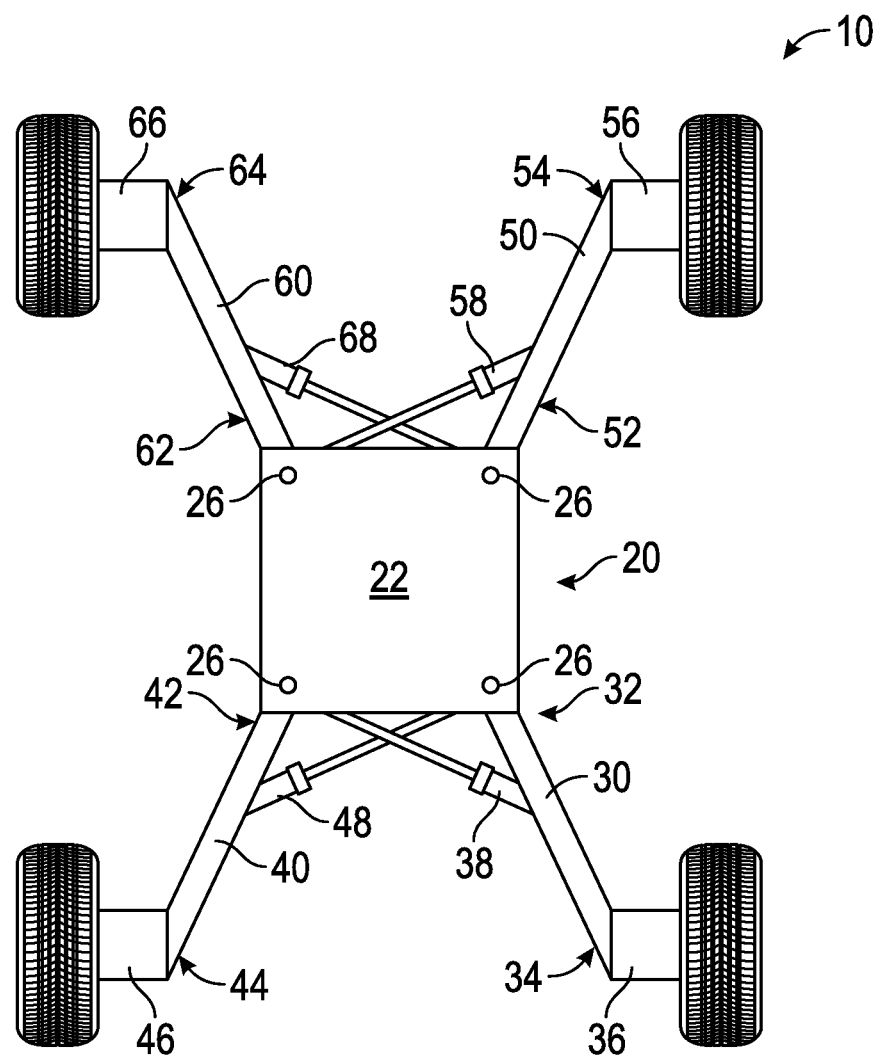
FIG. 3 is a schematic view of a lift device, according to an exemplary embodiment.

Referring to FIGS. 1-3, a lift device, shown as lift device 10, includes a chassis, shown as chassis 20. According to an exemplary embodiment, chassis 20 includes a frame, shown as frame 22. As shown in FIGS. 1-3, a first axle 30, a second axle 40, a third axle 50, and a fourth axle 60 are pivotally coupled to frame 22. First axle 30 includes a frame end 32 and a wheel end 34, second axle 40 includes a frame end 42 and a wheel end 44, third axle 50 includes a frame end 52 and a wheel end 54, and fourth axle 60 includes a frame end 62 and a wheel end 64. A first wheel 36 is coupled to wheel end 34 of first axle 30, a second wheel 46 is coupled to wheel end 44 of second axle 40, a third wheel 56 is coupled to wheel end 54 of third axle 50, and a fourth wheel 66 is coupled to wheel end 64 of fourth axle 60.

As shown in FIG. 3, a first actuator 38, a second actuator 48, a third actuator 58, and a fourth actuator 68 are positioned to move first axle 30, second axle 40, third axle 50, and fourth axle 60, respectively. As shown in FIG. 3, first actuator 38, second actuator 48, third actuator 58, and fourth actuator 68 are linear actuators (e.g., hydraulic cylinders), extension and retraction thereof moving the corresponding axles. By way of example, first actuator 38, second actuator 48, third actuator 58, and fourth actuator 68 may drag or push the corresponding wheel and tire assemblies to rotate the corresponding axles. By way of another example, one or more actuators may turn the wheel and tire assemblies to facilitate rotation of the axles by first actuator 38, second actuator 48, third actuator 58, and fourth actuator 68. In other embodiments, at least one of first actuator 38, second actuator 48, third actuator 58, and fourth actuator 68 is another type of actuator (e.g., a rotational actuator, a wheel drive, etc.) positioned to otherwise move the corresponding axles. In one embodiment, a first actuator is positioned to turn at least one of first wheel 36, second wheel 46, third wheel 56, and fourth wheel 66, and a second actuator (e.g., a wheel drive motor) drives the wheel along a curved path to rotate the corresponding axle. By way of example, at least one of first actuator 38, second actuator 48, third actuator 58, and fourth actuator 68 may be wheel drive motors configured to drive lift device 10 and move at least one of first axle 30, second axle 40, third axle 50, and fourth axle 60, respectively. Such a system may or may not employ linear actuators (e.g., hydraulic cylinders) to rotate the axles.

As shown in FIGS. 1-2, lift device 10 includes a lift boom, shown as lift boom 70. According to an exemplary embodiment, lift boom 70 is rotatably coupled to chassis 20. As shown in FIGS. 1-2, lift boom 70 is coupled to a turntable 24 that is configured to rotate relative to frame 22. Rotation of turntable 24 may be facilitated by a bearing disposed between turntable 24 and frame 22. As shown in FIGS. 1-2, a load device, shown as aerial work platform 80, is coupled to lift boom 70. In another embodiment, the load device includes lift forks or another system configured to support a working load.

Referring still to FIG. 1, lift boom 70 includes a plurality of telescoping boom sections. An actuator may extend the plurality of telescoping boom sections to increase the extension length of lift boom 70 (e.g., during operation of lift device 10 by an operator aboard aerial work platform 80). According to the exemplary embodiment shown in FIG. 1, lift boom 70 is pivotally coupled to turntable 24 such that aerial work platform 80 may be elevated relative to a ground surface. In one embodiment, an actuator pivots lift boom 70 upward, thereby increasing a working height of aerial work platform 80.

According to an exemplary embodiment, lift boom 70 is operable within a work envelope. The work envelope is defined by the volume within which lift boom 70 or aerial work platform 80 may be operated without lift device 10 reaching a tip condition (e.g., a point where the center of gravity for lift device 10 extends past a tip line). In one embodiment, the work envelope is generally dome shaped. By way of example, lift boom 70 may be at least one of extended and elevated until lift device 10 reaches a tip condition (e.g., extended away from the chassis until lift device 10 reaches a tip condition, extended laterally until lift device 10 reaches a tip condition, elevated and extended until lift device 10 reaches a tip condition, etc.). In one embodiment, the work envelope is a function of the physical characteristics of lift device 10. By way of example, the work envelope may be a function of the wheelbase of lift device 10, the weight of a counterweight supported by turntable 24, the weight of lift boom 70, or still other characteristics. The work envelope may also be a function of a working load supported by aerial work platform 80. By way of example, the work envelope may be reduced for larger working loads because lift device 10 will approach a tip condition with less extension or elevation of lift boom 70 (i.e., an operator may extend lift boom 70 further with less load supported by aerial work platform 80).

Referring again to the embodiment shown in FIG. 1, lift device 10 includes a sensor 90. Sensor 90 is positioned to monitor an orientation (e.g., position, extension, elevation, etc.) of lift boom 70. In other embodiments, sensor 90 includes a sensor (e.g., a linear sensor) used to measure the rotation of an axle. One sensor may be included with each axle to allow for independent axle control. Such sensors 90 may be used to determine chassis orientation. As shown in FIG. 1, sensor 90 includes a rotational position sensor disposed between turntable 24 and frame 22. The rotational position sensor may be configured to monitor a rotational position of (e.g., with an encoder) turntable 24 and lift boom 70 relative to frame 22. By way of example, the rotational position sensor may monitor the relative movement of two components (e.g., the movement of turntable 24 relative to frame 22, the movement of aerial work platform 80 relative to frame 22, etc.). By way of another example, the rotational position sensor may monitor the absolute rotational position of turntable 24, lift boom 70, or still another component.

According to an alternative embodiment, sensor 90 includes a linear position sensor. In one embodiment, the linear position sensor includes a rotary position sensor having a drum coupled to a length of cable. A first end of the cable is wound around the drum and a second end of the cable is coupled to a section of lift boom 70. Extension of lift boom 70 pulls out the cable (i.e. unwinding the cable off the drum) to rotate the drum, and the drum rotation is sensed by the rotary position sensor. The orientation monitored by the linear position sensor may include the extension length of lift boom 70. By way of example, the linear position sensor may monitor the relative movement of two components (e.g., the movement of at least two sections of lift boom 70, the movement of aerial work platform 80 relative to frame 22, etc.). By way of another example, the linear position sensor may monitor the extension of lift boom 70 absolutely (e.g., by monitoring the absolute position of at least one section of lift boom 70).

According to still another alternative embodiment, sensor 90 is configured to monitor the elevation of lift boom 70. By way of example, sensor 90 may include a rotational position sensor disposed between lift boom 70 and turntable 24. In one embodiment, sensor 90 is a rotational position sensor coupled to a pin (e.g., a load pin) positioned to join a main lift cylinder to the turntable structure. By way of another example, sensor 90 may include a linear position sensor disposed between lift boom 70 and turntable 24. Sensor 90 may monitor the elevation of lift boom 70 absolutely or may monitor the relative movement of two components (e.g., lift boom 70 relative to turntable 24, etc.). Sensor 90 may also include a load pin (e.g., positioned to join the lift cylinder to the turntable structure) to facilitate determining the load on boom 70. The load pin may also provide redundancy for the boom angle and boom extension sensors. According to yet another alternative embodiment, lift device 10 includes a plurality of sensors configured to monitor at least one of the rotational position, extension length, and elevation of lift boom 70.

As shown in FIG. 1, lift device 10 includes a controller 100. Controller 100 is configured to engage at least one of first actuator 38, second actuator 48, third actuator 58, and fourth actuator 68. According to an exemplary embodiment, controller 100 engages at least one of the actuators based on an orientation (e.g., a rotational position, an extension length, an elevation, etc.) of lift boom 70 to adjust the work envelope of lift boom 70. Engagement of first actuator 38, second actuator 48, third actuator 58, and fourth actuator 68 moves first axle 30, second axle 40, third axle 50, and fourth axle 60, respectively. Controller 100 may also be configured to facilitate various other operations of lift device 10. By way of example, controller 100 may be configured to provide command signals relating to the rotation of turntable 24 and lift boom 70 relative to frame 22, extension of lift boom 70, and driving at least one of first wheel 36, second wheel 46, third wheel 56, and fourth wheel 66, among other operations.

As shown in FIG. 3, first axle 30, second axle 40, third axle 50, and fourth axle 60 are coupled to frame 22 with a plurality of pins 26. Pins 26 rotatably couple first axle 30, second axle 40, third axle 50, and fourth axle 60 to frame 22 and facilitate pivotal movement therebetween. In one embodiment, pins 26 are oriented vertically such that first axle 30, second axle 40, third axle 50, and fourth axle 60 rotate about a plurality of vertical axes. Lift device 10 having vertically oriented pins 26 reduces or eliminates vertical movement of frame 22 as first actuator 38, second actuator 48, third actuator 58, and fourth actuator 68 move first axle 30, second axle 40, third axle 50, and fourth axle 60. The vertical orientation of pins 26 facilitates adjusting the work envelope of lift device 10 while maintaining the orientation of various components (e.g., lift device 10, lift boom 70, aerial work platform 80, etc.) relative to a ground surface. Maintaining the orientation of the various components reduces the impact of adjusting the work envelope on users' experience. By way of example, reducing vertical movement of aerial work platform 80 reduces the interruption a worker may otherwise experience while maneuvering a component into place or performing a welding operation. Lift device 10 thereby dynamically adjusts the work envelope (e.g., based on an orientation of lift boom 70) without adversely impacting worker productivity.

Referring next to FIGS. 4-7, first axle 30, second axle 40, third axle 50, and fourth axle 60 are moveable between various positions. In one embodiment, controller 100 is configured to engage at least one of first actuator 38, second actuator 48, third actuator 58, and fourth actuator 68 to move first axle 30, second axle 40, third axle 50, and fourth axle 60, respectively. As shown in FIGS. 4-7, first axle 30 is movable between a narrow position 30', an intermediate position 30", and a wide position 30'''; second axle 40 is movable between a narrow position 40', an intermediate position 40", and a wide position 40'''; third axle 50 is movable between a narrow position 50', an intermediate position 50", and a wide position 50'''; and fourth axle 60 is movable between a narrow position 60', an intermediate position 60", and a wide position 60'''. First axle 30, second axle 40, third axle 50, and fourth axle 60 may be rotated into any location between narrow position 30', intermediate position 30", and wide position 30'''; narrow position 40', intermediate position 40", and wide position 40'''; narrow position 50', intermediate position 50", and wide position 50'''; and narrow position 60', intermediate position 60", and wide position 60''', respectively.

Figure 5A:
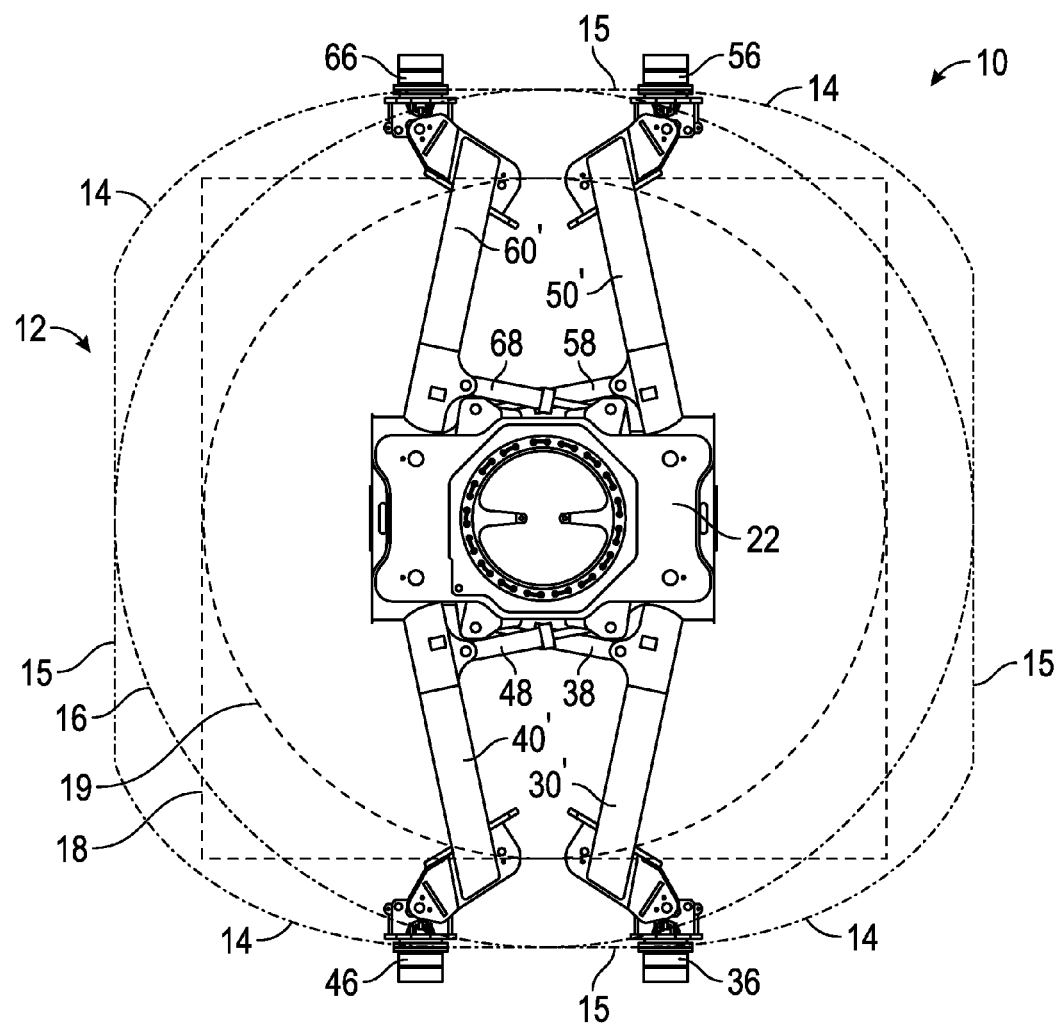
Figure 5B:
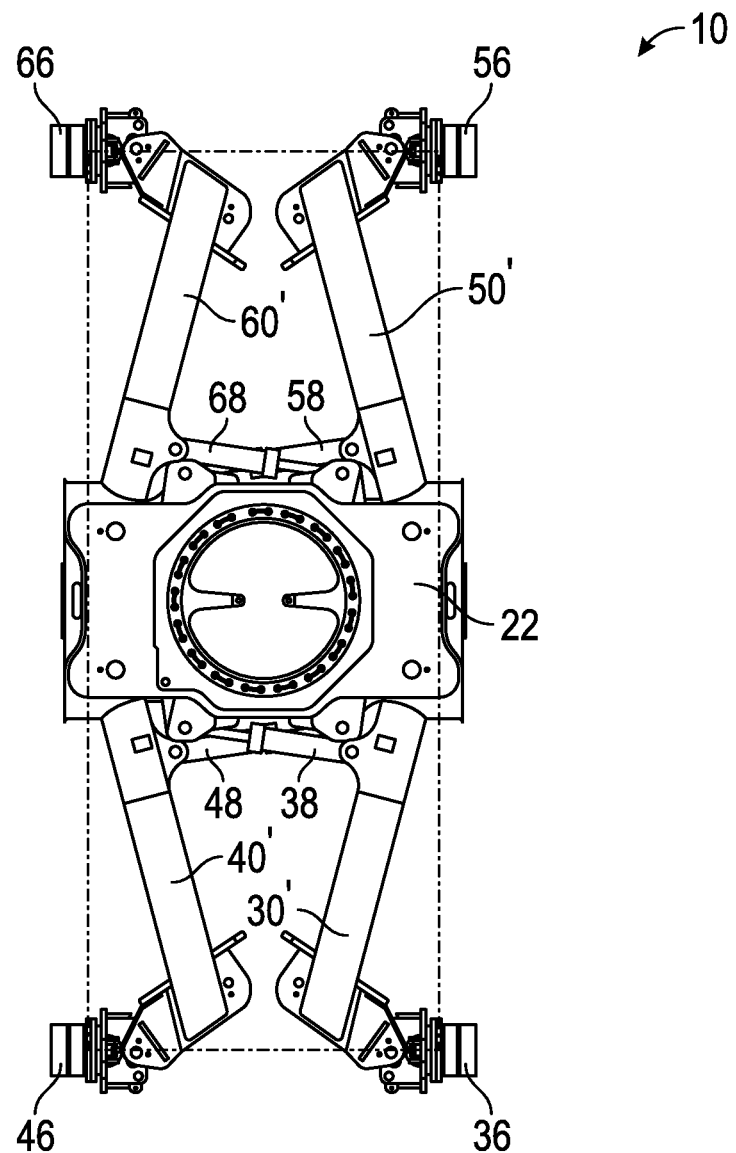

As shown in FIGS. 5a-5b, first axle 30 is rotated into narrow position 30', second axle 40 is rotated into narrow position 40', third axle 50 is rotated into narrow position 50', and fourth axle 60 is rotated into narrow position 60'. According to an exemplary embodiment, first wheel 36, second wheel 46, third wheel 56, and fourth wheel 66 are rotatably coupled to first axle 30, second axle 40, third axle 50, and fourth axle 60. First wheel 36, second wheel 46, third wheel 56, and fourth wheel 66 may be turned (e.g., with an actuator) between the positions shown in FIG. 5a and the positions shown in FIG. 5b. In one embodiment, first wheel 36, second wheel 46, third wheel 56, and fourth wheel 66 may be turned to facilitate the rotation of first axle 30, second axle 40, third axle 50, and fourth axle 60. After first axle 30, second axle 40, third axle 50, and fourth axle 60 reach narrow position 30', narrow position 40', narrow position 50', and narrow position 60', first wheel 36, second wheel 46, third wheel 56, and fourth wheel 66 may be turned from the positions shown in FIG. 5a to the positions shown in FIG. 5b. With the wheels in the positions shown in FIG. 5b, lift device 10 may be driven through narrow alleys, down narrow streets, along narrow pathways, or into a shipping container.

Figure 6:
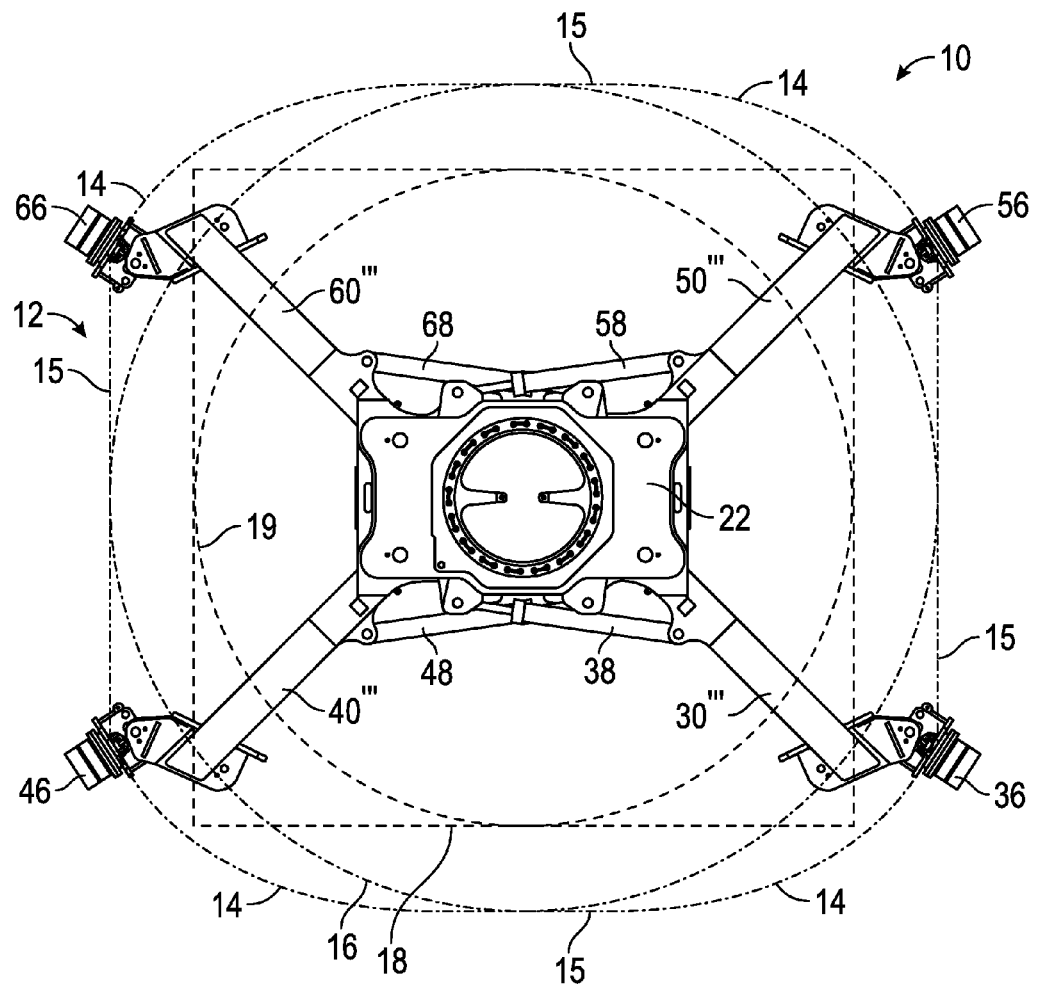
Figure 7:
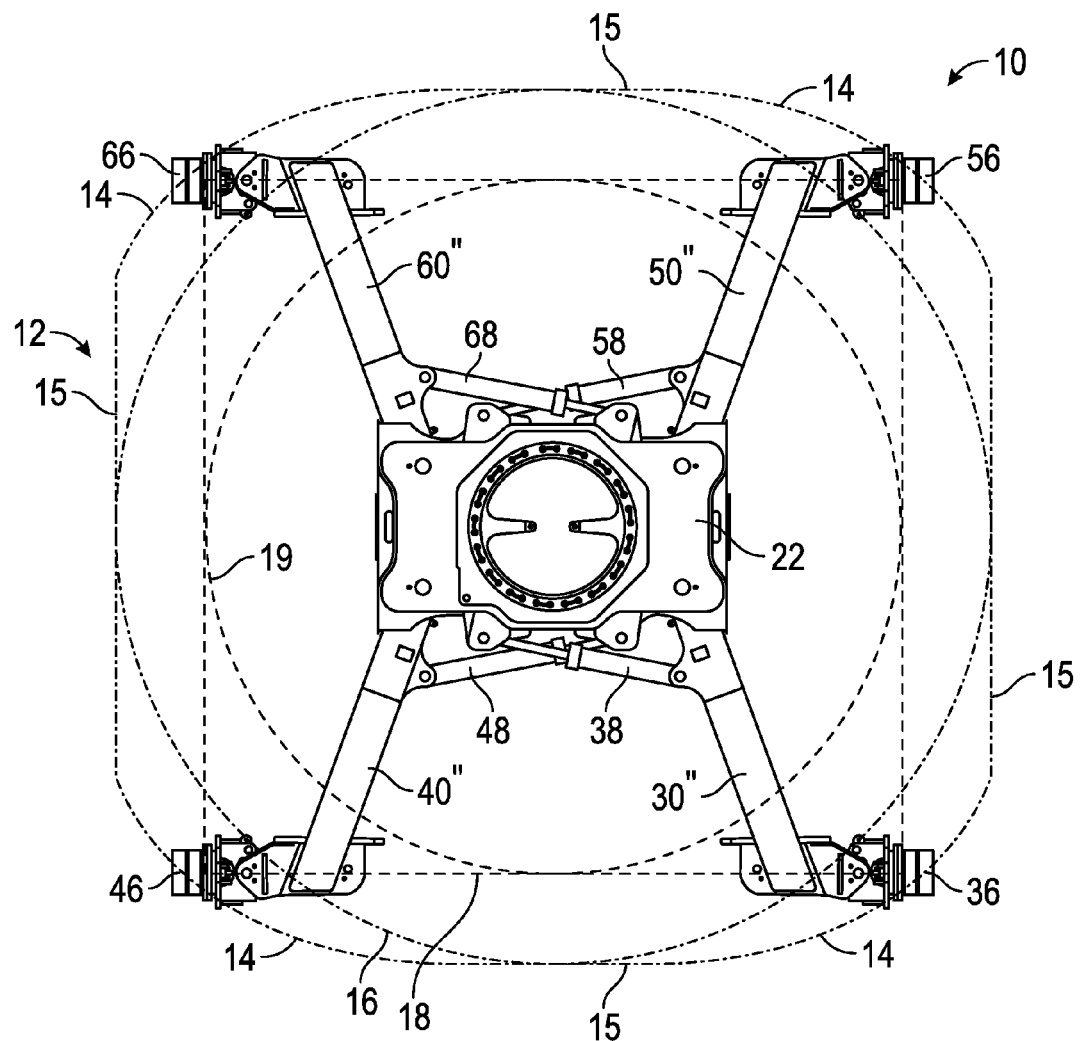

As shown in FIG. 6, first axle 30 is rotated into wide position 30''', second axle 40 is rotated into wide position 40''', third axle 50 is rotated into wide position 50''', and fourth axle 60 is rotated into wide position 60'''. As shown in FIG. 7, first axle 30 is rotated into intermediate position 30", second axle 40 is rotated into intermediate position 40", third axle 50 is rotated into intermediate position 50", and fourth axle 60 is rotated into intermediate position 60". In one embodiment, first actuator 38, second actuator 48, third actuator 58, and fourth actuator 68 include linear actuators (e.g., hydraulic cylinders, etc.), extension and retraction of the linear actuators moving the axles between the positions shown in FIGS. 4-7. Actuators may turn first wheel 36, second wheel 46, third wheel 56, and fourth wheel 66 to facilitate axle movement. In one embodiment, axle brakes are also released to facilitate free movement of the wheel and tire assemblies, thereby reducing the forces needed to rotate the axles.

Referring still to FIGS. 4-7, lift device 10 that reconfigures first axle 30, second axle 40, third axle 50, and fourth axle 60 has a work envelope that is greater than traditional lift devices. A lift device may reach a tip condition when the center of gravity thereof is positioned outside of a tip line. Lift device 10 has tip lines that vary based on the position of first axle 30, second axle 40, third axle 50, and fourth axle 60.

As shown in FIGS. 4-7, lift device 10 has a combined tip line 12 and a constant radius stability circle 16 that is larger (i.e., has a greater area, is more expansive, etc.) than the tip line 18 and constant radius stability circle 19 of traditional lift devices with axles having fixed operating positions. By way of example, constant radius stability circle 16 may be 109 inches while constant radius stability circle 19 of traditional lift devices may be 90 inches. Combined tip line 12 represents the tip lines of lift device 10 for various axle configurations, according to one embodiment. Combined tip line 12 includes curved portions 14 that are defined by the paths through which first wheel 36, second wheel 46, third wheel 56, and fourth wheel 66 sweep as first axle 30, second axle 40, third axle 50, and fourth axle 60 rotate between the positions shown in FIGS. 4-7. Combined tip line 12 also includes straight portions 15 that are defined between locations of first wheel 36, second wheel 46, third wheel 56, and fourth wheel 66 when lift device 10 is configured as shown in FIGS. 5a and 6.

Figure 4:
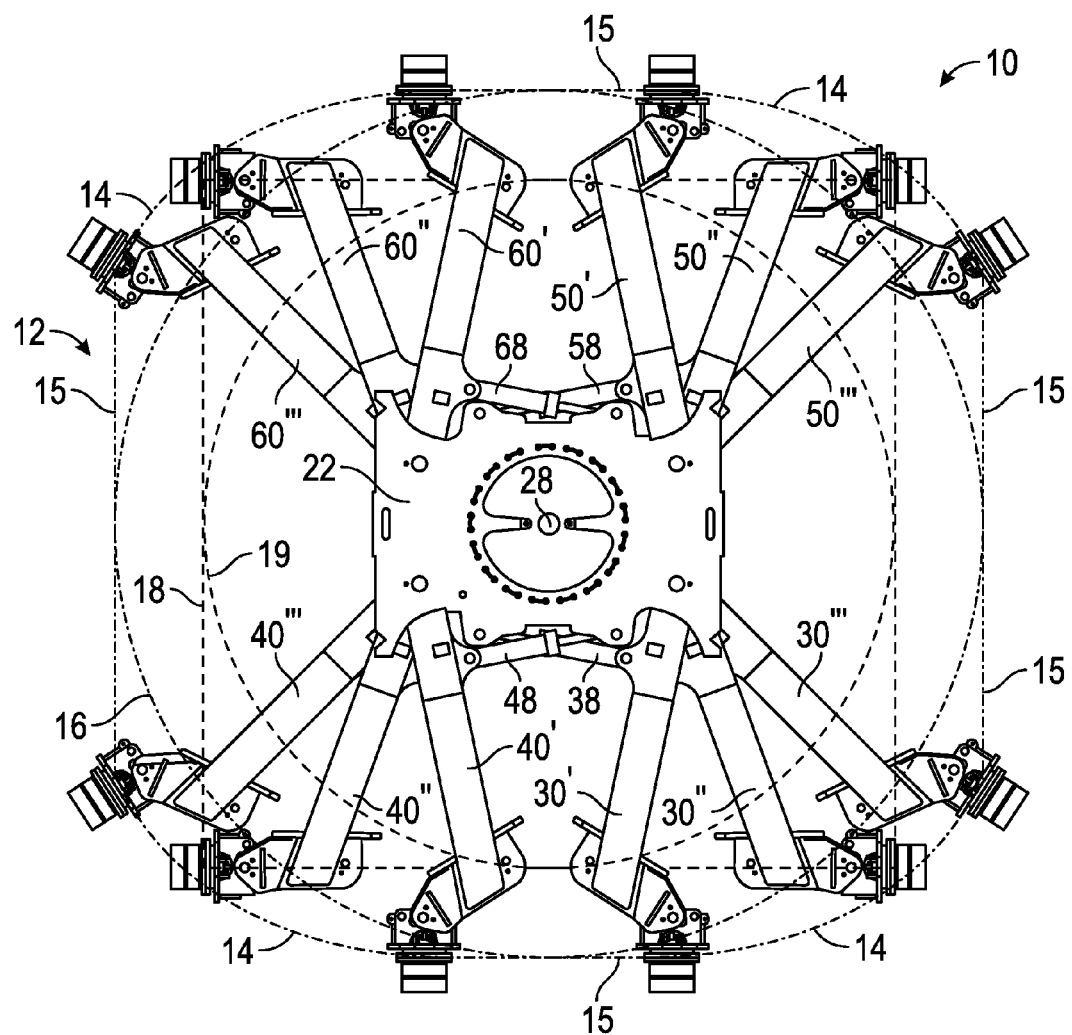
FIGS. 4-7 are top plan views of a lift device having axles that are moveable between narrow positions and wide positions, according to an exemplary embodiment.

As shown in FIG. 4, at least one of a turntable and a lift boom may rotate relative to frame 22 about a point of rotation 28. According to an exemplary embodiment, constant radius stability circle 16 includes the largest circle centered at the point of rotation 28 that falls entirely within combined tip line 12. In one embodiment, constant radius stability circle 16 is tangent to straight portions 15 of combined tip line 12. As shown in FIG. 4, tip line 18 of traditional lift devices is defined between the locations of the wheels positioned on axles having fixed operating positions, and constant radius stability circle 19 includes the largest circle centered at the point of rotation 28 that falls entirely within tip line 18.

Controller 100 is configured to engage at least one of first actuator 38, second actuator 48, third actuator 58, and fourth actuator 68 based on the orientation of a lift boom. By way of example, an operator may engage a user interface at an aerial work platform to provide user input relating to a requested rotation, elevation, or extension of the lift boom. A controller may receive the user input and engage an actuator (e.g., a rotational actuator, etc.) to rotate, elevate, or extend the lift boom.

Figure 8:
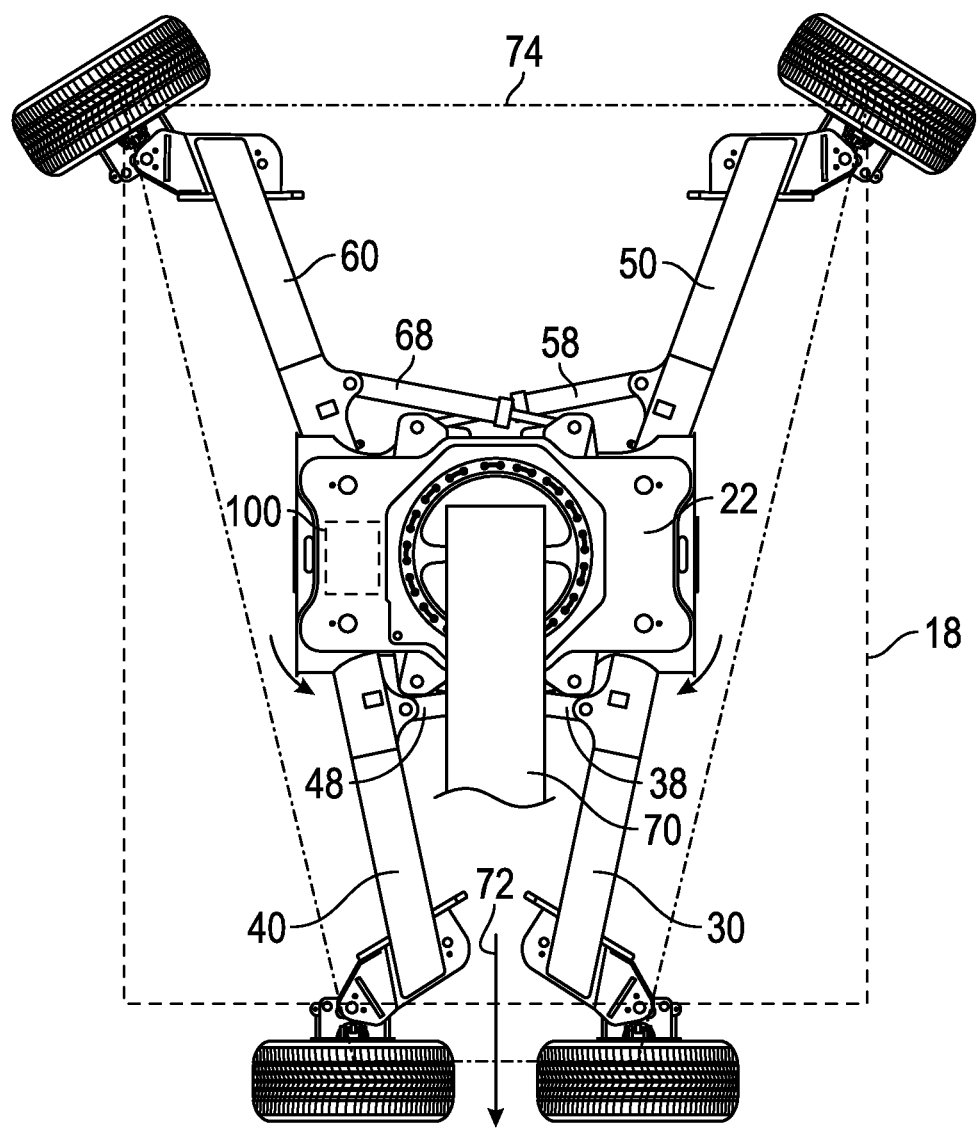
FIG. 8 is a top plan view of a lift device having a lift boom that is rotated into a first boom position, according to an exemplary embodiment.

As shown in FIG. 8, lift boom 70 is rotated into a first boom position (e.g., a first angular position) and extends along a first boom direction 72. In one embodiment, first axle 30, second axle 40, third axle 50, and fourth axle 60 are initially oriented in intermediate position 30", intermediate position 40", intermediate position 50", and intermediate position 60" as shown in FIG. 7. As lift boom 70 rotates toward the first boom position, controller 100 may engage first actuator 38 and second actuator 48 to rotate first axle 30 and second axle 40 toward lift boom 70. In one embodiment, first axle 30 and second axle 40 define a first set of axles. As shown in FIG. 8, first axle 30 is rotated clockwise from intermediate position 30" and second axle 40 is rotated counterclockwise from intermediate position 40". As lift boom 70 travels into the first boom position, controller 100 may engage first actuator 38 until first axle 30 reaches narrow position 30' and engage second actuator 48 until second axle 40 reaches narrow position 40'.

Referring still to FIG. 8, lift device 10 that reconfigures first axle 30 and second axle 40 when lift boom 70 is in the first boom position has a tip line 74. As shown in FIG. 8, tip line 74 extends further along first boom direction 72 than tip line 18 of traditional lift devices with axles having fixed operating positions. Controller 100 may engage at least one of third actuator 58 and fourth actuator 68 to move at least one of third axle 50 and fourth axle 60, respectively, to provide tip lines 74 having still other shapes.

According to an exemplary embodiment, lift device 10 adjusts the work envelope to increase forward stability by extending tip line 74 further outward along first boom direction 72 (i.e., the tip line is extended further from the machine center of gravity, thereby increasing stability). In one embodiment, lift device 10 increases forward stability (e.g., stability along first boom direction 72) without eliminating lateral stability (e.g., stability along a direction that is perpendicular to first boom direction 72). Lateral stability is important to accommodate loading (e.g., wind loading) that may occur (e.g., at an angle relative to first boom direction 72, etc.). Increasing forward stability enhances the operability of lift device 10. For a given weight, an operator of lift device 10 may extend lift boom 70 further outward along first boom direction 72 or elevate lift boom 70 further upward due to the adjusted work envelope. For a given extension or elevation of lift boom 70, an operator of lift device 10 may lift more weight due to the adjusted work envelope.

Figure 9:
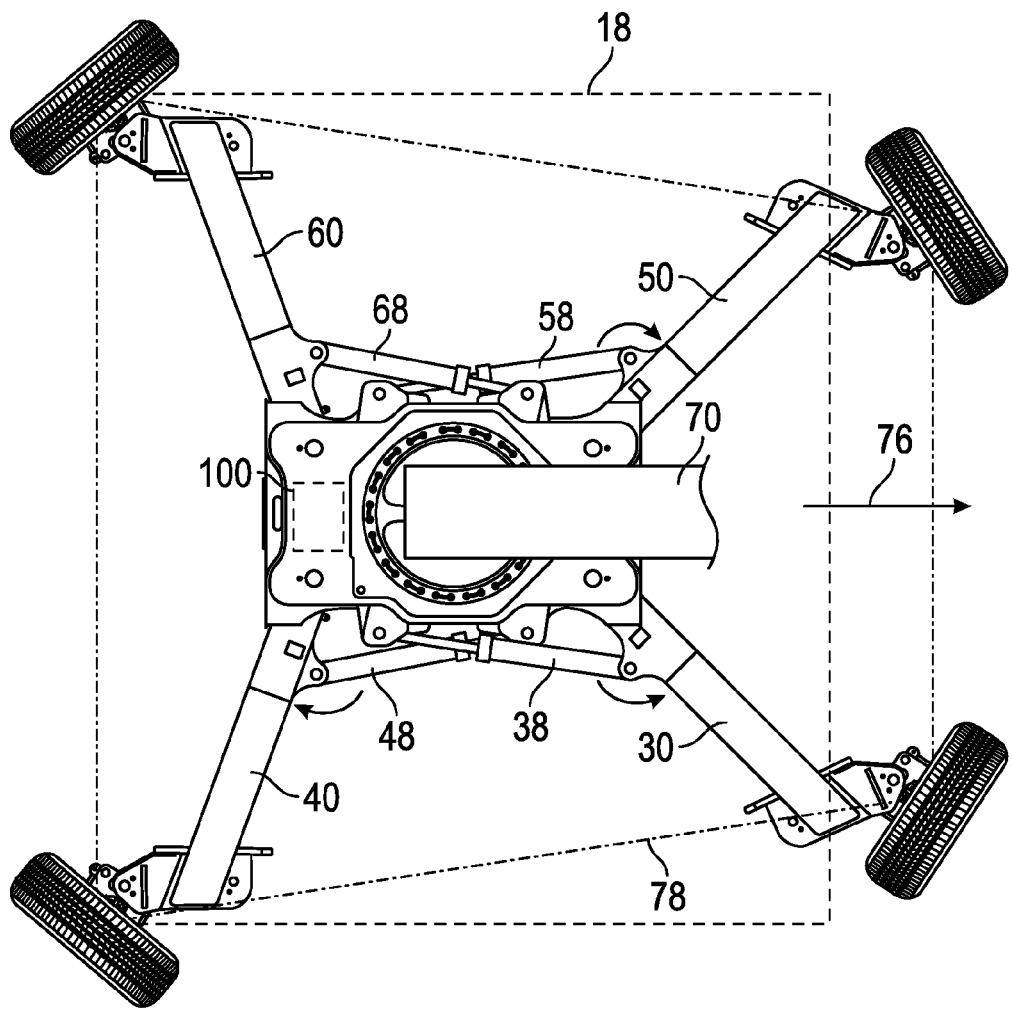
FIG. 9 is a top plan view of a lift device having a lift boom that is rotated into a second boom position, according to an exemplary embodiment.

An operator may engage the user interface at the aerial work platform to provide user input relating to a requested rotation of lift boom 70. In another embodiment, a requested rotation of lift boom 70 may be received from another source (i.e., lift device 10 may be operated autonomously or semi-autonomously, etc.). As shown in FIG. 9, lift boom 70 is rotated into a second boom position (e.g., a second angular position) and extends long a second boom direction 76. As lift boom 70 rotates toward the second boom position, controller 100 may engage first actuator 38 and third actuator 58 to rotate first axle 30 and third axle 50 toward lift boom 70. In one embodiment, first axle 30 and third axle 50 define a second set of axles. From the positions shown in FIG. 8, first axle 30 is rotated counterclockwise and third axle 50 is rotated clockwise into the positions shown in FIG. 9. According to an exemplary embodiment, controller 100 is configured to engage second actuator 48 to rotate second axle 40 away from lift boom 70. From the position shown in FIG. 8, second axle 40 is rotated clockwise into the position shown in FIG. 9. As lift boom 70 travels into the second boom position, controller 100 may engage first actuator 38 until first axle 30 reaches wide position 30''', engage second actuator 48 until second axle 40 reaches intermediate position 40", and engage third actuator 58 until third axle 50 reaches wide position 50'''.

Referring still to FIG. 9, lift device 10 that reconfigures first axle 30 and third axle 50 when lift boom 70 is in the second boom position has a tip line 78. As shown in FIG. 9, tip line 78 extends further along second boom direction 76 than tip line 18 of traditional lift devices with axles having fixed operating positions. Controller 100 may engage both second actuator 48 and fourth actuator 68 to move second axle 40 and fourth axle 60, thereby providing tip lines 74 having different shapes. In still other embodiments, controller 100 does not engage second actuator 48 to rotate second axle 40.

According to an exemplary embodiment, lift device 10 adjusts the work envelope to increase forward stability by extending tip line 78 further outward along second boom direction 76. In one embodiment, lift device 10 increases forward stability (e.g., stability along second boom direction 76) without eliminating lateral stability (e.g., stability along a direction that is perpendicular to second boom direction 76). Lateral stability is important to accommodate loading (e.g., wind loading) that may occur (e.g., at an angle relative to second boom direction 76, etc.). Increasing forward stability enhances the operability of lift device 10. For a given weight, an operator of lift device 10 may extend lift boom 70 further outward along second boom direction 76 or elevate lift boom 70 further upward due to the adjusted work envelope. For a given extension or elevation of lift boom 70, an operator of lift device 10 may lift more weight due to the adjusted work envelope.

As shown in FIGS. 8-9, controller 100 is configured to engage actuators to rotate the axles nearest lift boom 70 toward the position thereof. In one embodiment, the axles are rotated to follow the rotation of lift boom 70. Controller 100 may actively (e.g., continuously, at a sampling rate, etc.) monitor the stability condition of lift device and rotate the axles to actively adjust the work envelope of lift boom 70. By way of example, first axle 30, second axle 40, third axle 50, and fourth axle 60 may each define an angular offset relative to lift boom 70. The angular offsets may be each defined as the angle between first axle 30, second axle 40, third axle 50, and fourth axle 60 and lift boom 70 when viewed from above or below. According to an exemplary embodiment, controller 100 is configured to engage actuators to rotate the axles having the two smallest angular offsets toward lift boom 70, thereby reducing the angular offsets. According to an alternative embodiment, controller 100 is configured to engage actuators to rotate the two axles between which lift boom 70 is positioned.

According to an exemplary embodiment, lift device 10 dynamically varies the position of at least one of first axle 30, second axle 40, third axle 50, and fourth axle 60 based on the orientation of lift boom 70. By way of example, controller 100 may engage at least one of first actuator 38, second actuator 48, third actuator 58, and fourth actuator 68 to move the corresponding axle as lift boom 70 rotates between the first boom position shown in FIG. 8 and the second boom position shown in FIG. 9. In one embodiment, controller 100 is configured to engage the actuators equally as lift boom 70 rotates between the first boom position and the second boom position. According to an alternative embodiment, controller 100 is configured to engage at least one of the actuators more than another actuator as lift boom 70 rotates between the first boom position and the second boom position. By way of example, as lift boom 70 rotates from the first boom position to the second boom position, controller 100 may be configured to engage first actuator 38 to rotate first axle 30 counterclockwise at a greater rate than the clockwise rotations of second axle 40 and third axle 50. Lift device 10 may enhance forward stability while lift boom 70 rotates between the first boom position and the second boom position by rotating first axle 30 more quickly. In one embodiment, rotating the axles at different rates reduces the total power (e.g., hydraulic power, electrical power, etc.) required to drive the actuators.

In still other embodiments, controller 100 is configured to engage the actuators sequentially. By way of example, controller 100 may be configured to engage first actuator 38 to rotate first axle 30, engage third actuator 58 to rotate third axle 50, and then engage second actuator 48 to rotate second axle 40. Differential engagement of the actuators (e.g., at different rates, sequentially, etc.) may facilitate reducing the size of the system (e.g., hydraulic pump, electric batteries, etc.) used to power the actuators.

According to an exemplary embodiment, lift device 10 is configurable into different operating modes (e.g., a storage mode, a drive mode, a dynamic stability mode, etc.). An operator may provide user input by way of a user interface to select one of the modes. Controller 100 may receive the user input and configure lift device 10 into the corresponding operating mode.

In one embodiment, lift device 10 is configurable into a storage mode, a drive mode, and a dynamic stability mode. Lift device 10 may perform different functions based on the operating mode selected. According to an exemplary embodiment, controller 100 is configured to limit (e.g., eliminate) an operator's ability to drive lift device 10 when operating in the dynamic stability mode but facilitate driving movement of lift device 10 when operating in the storage mode or the drive mode.

In response to user input selecting the storage mode, controller 100 is configured to engage first actuator 38, second actuator 48, third actuator 58, and fourth actuator 68 to rotate first axle 30, second axle 40, third axle 50, and fourth axle 60 into the positions shown in FIG. 5b (i.e., into narrow position 30', narrow position 40', narrow position 50', and narrow position 60'), according to an exemplary embodiment. Controller 100 may also engage actuators to turn first wheel 36, second wheel 46, third wheel 56, and fourth wheel 66 into the positions shown in FIG. 5b. In another embodiment, controller 100 is configured to automatically enter the storage mode (e.g., when a sensing system indicates that the lift device is approaching a narrow street, when a sensing system indicates that the lift device is approaching a shipping container, etc.). In response to user input selecting the drive mode, controller 100 is configured to engage first actuator 38, second actuator 48, third actuator 58, and fourth actuator 68 to rotate first axle 30, second axle 40, third axle 50, and fourth axle 60 into the positions shown in FIG. 7 (i.e., into intermediate position 30", intermediate position 40", intermediate position 50", and intermediate position 60"), according to an exemplary embodiment. Controller 100 may also engage actuators to turn first wheel 36, second wheel 46, third wheel 56, and fourth wheel 66 into the positions shown in FIG. 7. In one embodiment, storage mode facilitates positioning lift device 10 into a shipping container or driving lift device 10 along narrow alleys, streets, or pathways while the driving mode facilitates general movement of lift device 10 around a worksite. In another embodiment, controller 100 is configured to automatically enter the drive mode (e.g., when an operator provides user input relating to a requested movement of lift device 10, etc.).

In response to user input selecting the dynamic stability mode, controller 100 is configured to engage first actuator 38, second actuator 48, third actuator 58, and fourth actuator 68 to rotate first axle 30, second axle 40, third axle 50, and fourth axle 60 into the positions shown in FIG. 7 (i.e., into intermediate position 30", intermediate position 40", intermediate position 50", and intermediate position 60"), according to an exemplary embodiment. Controller 100 may also engage actuators to orient first wheel 36, second wheel 46, third wheel 56, and fourth wheel 66 tangent to first axle 30, second axle 40, third axle 50, and fourth axle 60, respectively. Turning the wheels facilitates movement of the axles, according to one embodiment. In another embodiment, controller 100 is configured to automatically enter the dynamic stability mode (e.g., when a sensing system indicates that a load is applied to lift boom 70).

In one embodiment, lift device 10 includes a plurality of sensors configured to monitor the position of the first axle 30, second axle 40, third axle 50, and fourth axle 60 and provide corresponding sensing signals. In one embodiment, controller 100 is configured to evaluate the sensing signals before engaging first actuator 38, second actuator 48, third actuator 58, and fourth actuator 68. Where first axle 30, second axle 40, third axle 50, or fourth axle 60 are already configured in the position appropriate for a particular operating mode, controller 100 may not engage the corresponding actuator. Controller 100 may also monitor the sensing signals as a feedback for the position of the axle and engage at least one of the actuators until the axle reaches a target location (e.g., when switching modes, when operating in dynamic stability mode, etc.). In another embodiment, controller 100 establishes a current set point for each of the axles and incrementally engages the actuators based on the current set point for each of the axles and a target location for each of the axles. By way of example, an axle may be movable between positions 0 and 100. If the current position of the axle is 70 and the target position of the axle is 80, controller 100 may engage the actuator to move 10 positions, with or without monitoring the sensing signals as a feedback for the position of the axle.

In one embodiment, controller 100 engages actuators to rotate axles based on the orientation of lift boom 70 when lift device 10 is configured in the dynamic stability mode. By way of example, controller 100 may monitor the orientation of lift boom 70 and reconfigure (e.g., rotate) at least one of first axle 30, second axle 40, third axle 50, and fourth axle 60 as lift boom 70 rotates around frame 22. Reconfiguring at least one of first axle 30, second axle 40, third axle 50, and fourth axle 60 in the dynamic stability mode increases forward stability of lift device 10 (i.e., stability in the direction of lift boom 70), according to an exemplary embodiment.

Figure 10:
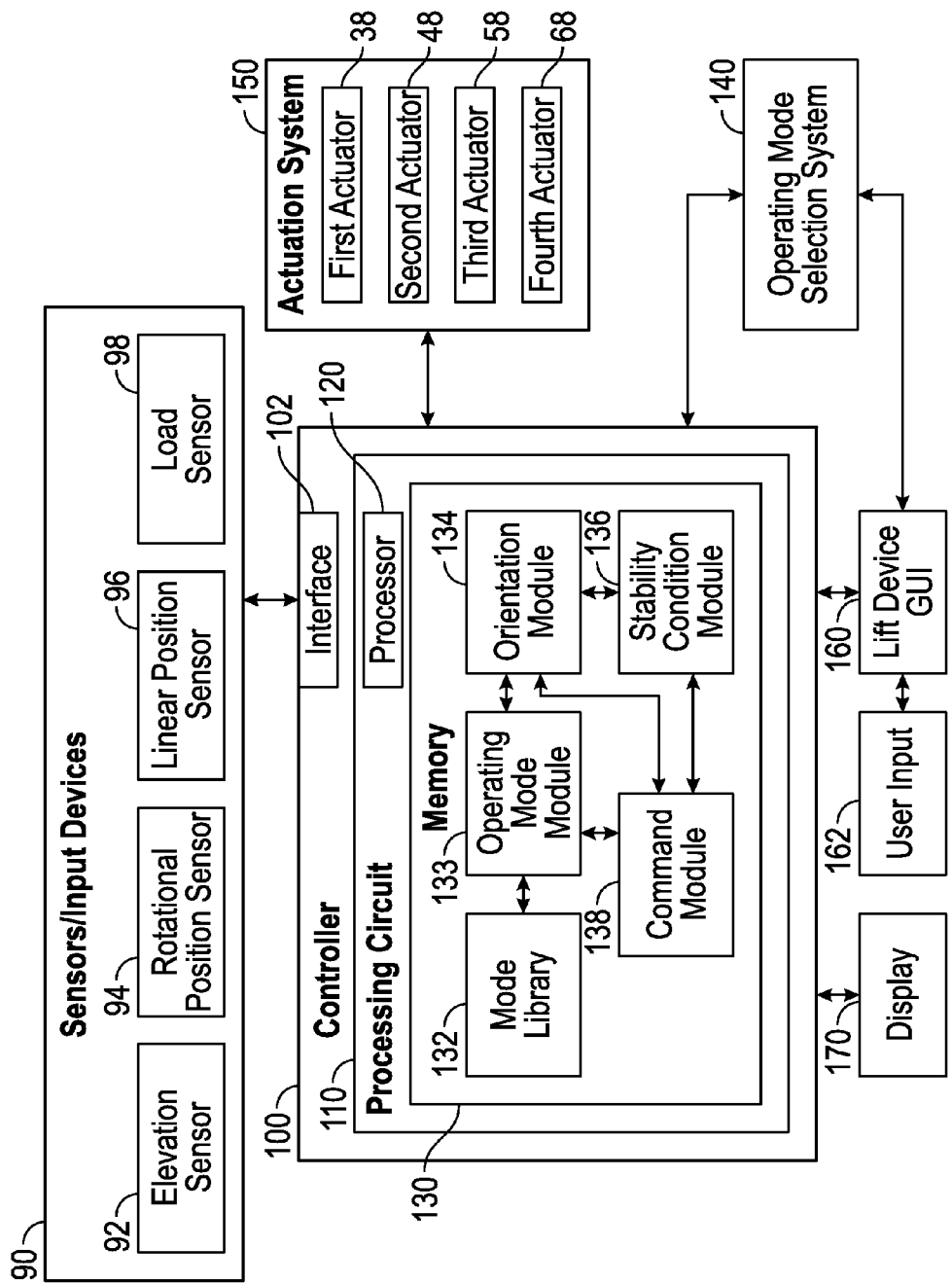
FIG. 10 is a block diagram of a control system for a lift device, according to an exemplary embodiment.

Referring next to the block diagram shown in FIG. 10, controller 100 engages various systems and devices to facilitate operation of a lift device. As shown in FIG. 10, controller 100 receives input from one or more sensors 90. Sensors 90 may be configured to evaluate an orientation of a lift boom and provide sensing signals to be analyzed by controller 100. As shown in FIG. 10, sensors 90 includes an elevation sensor 92, a rotational position sensor 94, a linear position sensor 96, and a load sensor 98 (e.g., a load pin positioned to monitor a reaction force generated by a load on the lift boom). In other embodiments, sensors 90 include at least one of elevation sensor 92, rotational position sensor 94, linear position sensor 96, and load sensor 98.

According to the exemplary embodiment shown in FIG. 10, controller 100 includes an interface, shown as interface 102. Interface 102 may include hardware to receive data, sensing signals, or other information from a network or a serial bus and to communicate data to another processing circuit via a network or a serial bus. Interface 102 may be configured to receive or transmit data wirelessly or over a hard-wired connection. As shown in FIG. 10, controller 100 communicates with sensors 90 across interface 102.

As shown in FIG. 10, controller 100 includes a processing circuit 110 having a processor 120 and a memory 130. Processor 120 may include one or more microprocessors, application specific integrated circuits (ASICs), circuits containing one or more processing components, circuitry for supporting a microprocessor, or other hardware configured for processing. In some embodiments, processor 120 is configured to execute computer code stored in memory 130 to facilitate the activities described herein. Memory 130 may be any volatile or non-volatile computer-readable storage medium capable of storing data or computer code relating to the activities described herein. As shown in FIG. 10, memory 130 is shown to include modules having computer code modules (e.g., executable code, object code, source code, script code, machine code, etc.) configured for execution by processor 120. In some embodiments, processing circuit 110 represents a collection of processing devices (e.g., servers, data centers, etc.). In such cases, processor 120 represents the collective processors and memory 130 represents the collective storage of the devices.

Referring still to the exemplary embodiment shown in FIG. 10, memory 130 includes a mode library 132, an operating mode module 133, an orientation module 134, a stability condition module 136 and a command module 138. In other embodiments, memory 130 includes more or fewer modules. Mode library 132 may include data relating to the operation of a lift device for a storage mode, a drive mode, and a dynamic stability mode, among others. In one embodiment, the data may include at least one of permitted functions for the modes and parameters for operation within the modes. By way of example, mode library 132 may include target positions (e.g., absolute positions, relative count positions, etc.) for axles of a lift device in each of the modes. By way of another example, mode library 132 may include a driving rate for wheels of the lift device associated with the drive mode. By way of still another example, mode library 132 may include a deadband associated with the dynamic stability mode, movement of the lift boom beyond the deadband triggering movement of the axles to improve forward stability.

According to an exemplary embodiment, operating mode module 133 is configured to retrieve data from the mode library 132. In one embodiment, operating mode module 133 is configured to use data from an operating mode selection system 140 to retrieve appropriate data from mode library 132. By way of example, operating mode module 133 may retrieve data from mode library 132 relating to a storage mode when operating mode selection system 140 provides signals relating to operating the lift device within the storage mode. In another embodiment, operating mode module 133 is configured to manage data stored in mode library 132, thereby allowing for active control (e.g., by an operator) over the parameters associated with the operating modes. By way of example, operating mode module 133 may overwrite default settings associated with the deadband of the dynamic stability mode. Operating mode module 133 may be configured to prevent modification of other parameters (e.g., driving rate for the wheels in the drive mode, the rate at which the axles move in the dynamic stability mode, etc.) to reduce the risk of operators overriding limits on the operation of the lift device.

Referring still to the embodiment shown in FIG. 10, orientation module 134 is configured to use data from sensors 90 and evaluate a current orientation of a lift boom, according to an exemplary embodiment. In one embodiment, the current orientation includes the rotational position, the extension, and the elevation of the lift boom. Orientation module 134 may evaluate the current orientation of the lift boom relative to a neutral position. By way of example, the neutral position of the lift boom may be straight ahead (e.g., along a primary driving direction), fully retracted, and lowered to a minimum elevation. Accordingly, orientation module 134 may determine the current orientation of the lift boom in three components. By way of example, the current orientation of the lift boom may include an angle relative to the straight ahead position, an extension length relative to the fully retracted position, and an angle relative to the minimum elevation.

According to an exemplary embodiment, stability condition module 136 is configured to evaluate a stability condition of the lift device. In one embodiment, stability condition module 136 uses the current orientation of the lift boom determined by orientation module 134 to evaluate the stability condition of the lift device. Stability condition module 136 may also evaluate the stability condition of the lift device based on information from one or more sensors 90. By way of example, stability condition module 136 may use data from load sensor 98 relating to a load supported by the lift boom (e.g., a reaction force generated by a load on the lift boom, etc.). According to an exemplary embodiment, stability condition module 136 also evaluates the orientation (e.g., extension, rotational position, etc.) of an axle to determine the stability condition of the lift device. Stability condition module 136 may provide the stability condition as a distance from the center of gravity of the lift device to a tip line, a rate at which the center of gravity of the lift device is moving, a position of the lift boom within a work envelope, or any combination thereof.

Referring still to FIG. 10, command module 138 is configured to interface with stability condition module 136 and trigger a command signal based on the stability condition of the lift device. In one embodiment, command module 138 engages operating mode module 133 and triggers the command signal only when the lift device is in a dynamic stability mode. According to the exemplary embodiment shown in FIG. 10, an actuation system 150 including first actuator 38, second actuator 48, third actuator 58, and fourth actuator 68 is coupled to controller 100. In one embodiment, the command signal engages at least one of first actuator 38, second actuator 48, third actuator 58, and fourth actuator 68 to increase forward stability by varying the footprint of the lift device. Command module 138 may trigger a single command signal configured to engage each of first actuator 38, second actuator 48, third actuator 58, and fourth actuator 68 or may trigger a plurality of command signals associated with first actuator 38, second actuator 48, third actuator 58, and fourth actuator 68, according to various embodiments.

In one embodiment, command module 138 is configured to trigger the command signal as the stability condition falls below a threshold value. By way of example, command module 138 may be configured to trigger the command signal as the distance from the center of gravity of the lift device to a tip line falls below one inch. According to an alternative embodiment, command module 138 is configured to trigger the command signal as the reaction force generated by a load on the lift boom exceeds a threshold value (e.g., 1000 pounds). In one embodiment, the threshold value is related to the orientation of the lift boom.

According to the exemplary embodiment shown in FIG. 10, controller 100 is coupled to a lift device graphical user interface (lift device GUI) 160. Lift device GUI 160 may be configured to receive a user input 162 related to the functionality of the lift device. Lift device GUI 160 may be any type of user interface. For example, lift device GUI 160 may include an LCD configured to display a selected operating mode, a stability condition, an axle position or other feature, may include one or more pushbuttons, knobs, or other input devices, may include a touchscreen, and may include still other devices. User input 162 may be a user input related to lift device functionality. For example, user input 162 may be provided via lift device GUI 160 indicating a preferred change in vehicle operation (e.g., a change in operating mode, etc.). As another example, user input 162 may be provided that relates to movement of the wheels or the lift boom of the lift device (e.g., to rotate the turntable and lift boom relative to the frame of the lift device, to drive the lift device, etc.).

As shown in FIG. 10, controller 100 is coupled to display 170. Display 170 may be a display coupled to a turntable of the lift device, coupled to an aerial work platform, or coupled to a remote system configured to control, or monitor performance of, the lift device. Display 170 is configured to provide an operator of the lift device with information, according to an exemplary embodiment. By way of example, display 170 may be configured to display a selected operating mode, a stability condition, an axle position, or another operating condition of the lift device. In one embodiment, display 170 is a driver aid (e.g., an overlay on an LCD screen showing the lift device) that shows information (e.g., a current stability condition, a load supported by the lift boom, a reaction force due to the load on the lift boom, a current orientation of the lift boom, a tip line, etc.) to an operator, thereby facilitating use of the lift device.

Figure 11:
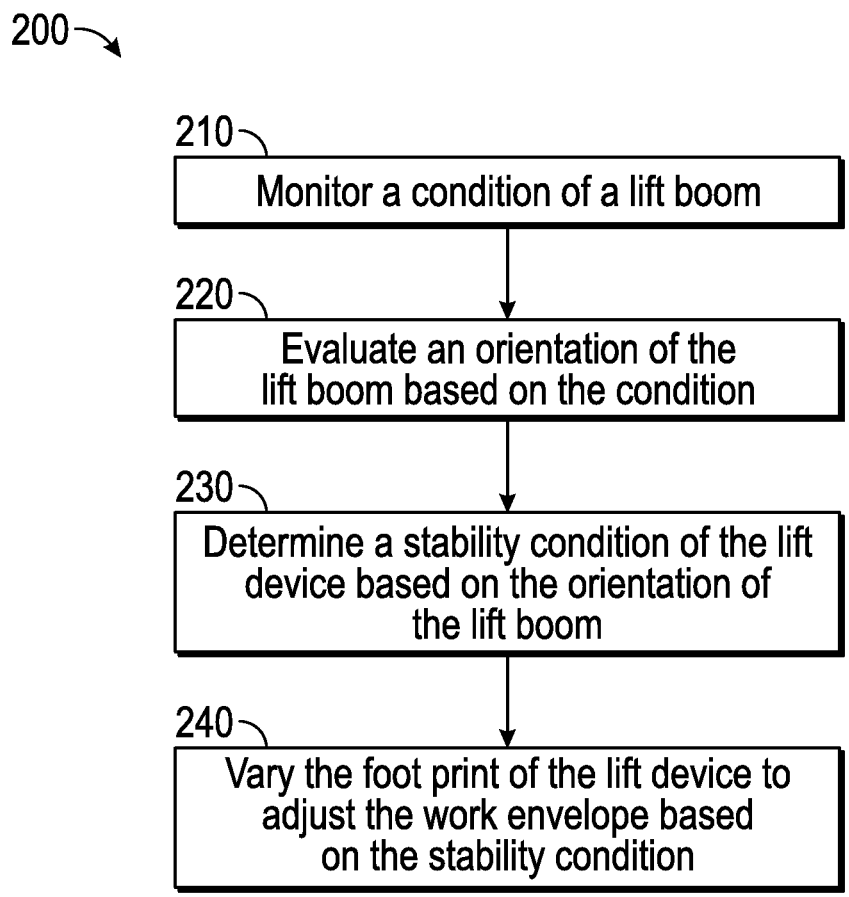
FIG. 11 is a block diagram of a method for controlling a lift device, according to an exemplary embodiment.

Referring next to FIG. 11, a method 200 for controlling a lift device is shown, according to an exemplary embodiment. In one embodiment, the lift device includes a lift boom that is operable within a work envelope. As shown in FIG. 11, method 200 includes monitoring a condition of a lift boom (210), evaluating an orientation (e.g., position, extension, elevation, etc.) of the lift boom based on the condition (220), determining a stability condition of the lift device based on the orientation of the lift boom (230), and varying a footprint of the lift device to adjust the work envelope based on the stability condition (240). In one embodiment, varying the footprint of the lift device includes engaging an actuator to move an axle. In another embodiment, varying the footprint of the lift device includes engaging a plurality of actuators to rotate a first set of axles toward the lift boom when the lift boom is in a first angular position and rotate a second set of axles toward the lift boom when the lift boom is in a second angular position. Method 200 thereby adjusts the work envelope based on the orientation of the lift boom, according to an exemplary embodiment.

Figure 12:
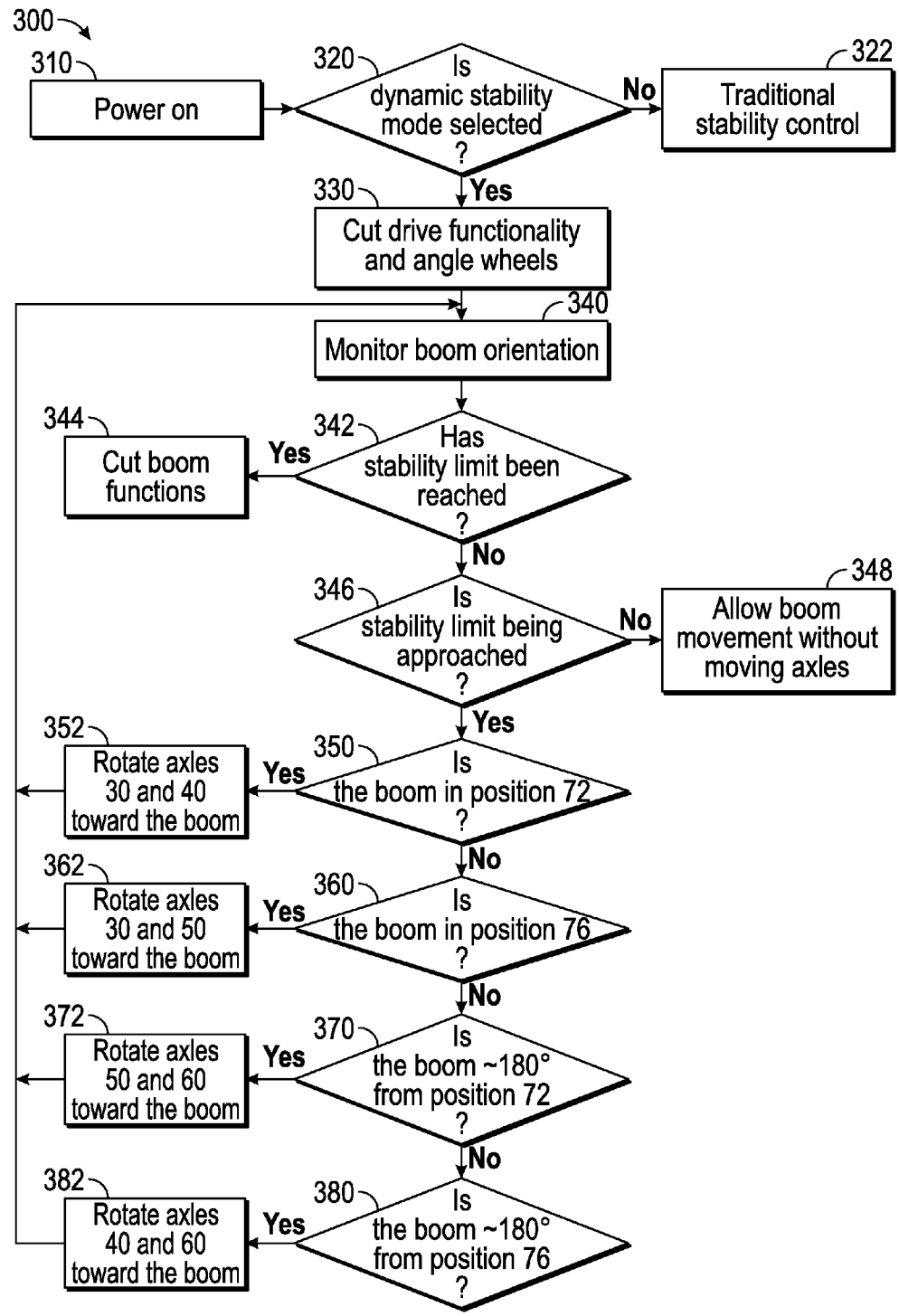
FIG. 12 is a block diagram of a control system for a lift device, according to an exemplary embodiment.

Referring next to FIG. 12, a control system 300 for a lift device is shown, according to an exemplary embodiment. As shown in FIG. 12, an operator may power on the lift device or control system (step 310) to begin utilizing the lift device (e.g., to perform an operation at a worksite). According to the exemplary embodiment shown in FIG. 12, control system 300 evaluates whether a dynamic stability mode has been selected (step 320). Where the dynamic stability mode has not been selected, control system 300 operates according to traditional strategies (e.g., according to a traditional profile using axles having fixed operating positions) and facilitates traditional control of the lift device (step 322). Where the dynamic stability mode has been selected, control system 300 cuts (e.g., disengages, terminates, turns "off," etc.) drive functionality to the lift device and angles each of the wheels (e.g., angle the wheels 35 degrees toward the center of the lift device, etc.) (step 330). Control system 300 then monitors the orientation of the boom (step 340). Control system 300 may monitor the orientation of the boom with at least one of a boom angle sensor, a boom extension sensor, a moment pin, axle deploy sensors, and a turntable rotation sensor. Control system 300 then evaluates whether a stability limit has been reached (step 342) and cuts boom functions (i.e., prevents further movement of the boom) if the stability limit has been reached (step 344). If the stability limit has not been reached, control system 300 evaluates whether the stability limit is being approached (step 346) and facilitates normal boom movement without moving the axles (step 348) if the stability limit is not being approached. If the stability limit is being approached, control system 300 evaluates whether the boom is in position 72 as shown in FIG. 8 (step 350), position 76 as shown in FIG. 9 (step 360), about 180 degrees from position 72 (step 370), or about 180 degrees from position 76 (step 380). In one embodiment, control system 300 evaluates the rotational position of the boom (e.g., with a turntable rotation sensor) between steps 346 and 350. If the boom is in position 72, position 76, about 180 degrees from position 72, or about 180 degrees from position 76, control system 300 rotates axles 30 and 40 (step 352), axles 30 and 50 (step 362), axles 50 and 60 (step 372), or axles 40 and 60 (step 382) toward the boom, respectively. After rotating the axles, control system 300 again monitors the boom orientation (step 340) until the system is disengaged (e.g., until an operator turns off the lift device or control system, until an operator turns off dynamic stability mode, etc.).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data, which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A lift device, comprising:
   a frame;
   a lift boom rotatably coupled to the frame, wherein the lift boom is rotatable between a first angular position and a second angular position and operable within a work envelope;
   a plurality of axles each having a frame end pivotally coupled to the frame and a wheel end opposite the frame end, wherein the plurality of axles comprise a first set of axles and a second set of axles;
   a plurality of actuators coupled to the plurality of axles;
   a rotational position sensor positioned to provide sensor data relating to a rotational position of the lift boom; and
   a controller configured to (a) determine the rotational position of the lift boom relative to the frame based on the sensor data, (b) engage the plurality of actuators to rotate the first set of axles toward the lift boom in response to a determination that the lift boom is in the first angular position, (c) monitor the rotational position of the lift boom as the lift boom rotates between the first angular position and the second angular position, and (d) engage the plurality of actuators to rotate the second set of axles toward the lift boom in response to a determination that the lift boom is in the second angular position, thereby adjusting the plurality of axles to follow the lift boom as it rotates relative to the frame.

2. The lift device of claim 1, wherein the plurality of axles includes a first axle, a second axle, and a third axle, and wherein the plurality of actuators includes a first actuator, a second actuator, and a third actuator.

3. The lift device of claim 2, wherein the first set of axles includes the first axle and the second axle, and wherein the second set of axles includes the second axle and the third axle.

4. The lift device of claim 3, wherein the plurality of axles are coupled to the frame with a plurality of vertical pins such that the plurality of axles rotate about a plurality of vertical axes, rotation of the first set of axles and the second set of axles adjusting the work envelope while maintaining an orientation of the lift boom relative to a ground surface.

5. The lift device of claim 3, wherein the first actuator, the second actuator, and the third actuator include linear actuators.

6. The lift device of claim 1, wherein the plurality of axles are engaged to rotate in a first plane, wherein a base end of the lift boom rotates in a second plane, rotation of the base end of the lift boom in the second plane detected by the rotational position sensor, and wherein the first plane is parallel to the second plane.

\* \* \* \* \*